G. HARDIN.
NUT LOCK.
APPLICATION FILED JULY 16, 1907.

910,678.

Patented Jan. 26, 1909.

Witnesses

Inventor
George Hardin
By Victor J. Evans
Attorney

UNITED STATES PATENT OFFICE.

GEORGE HARDIN, OF UNIOPOLIS, OHIO.

NUT-LOCK.

No. 910,678.  Specification of Letters Patent.  Patented Jan. 26, 1909.

Application filed July 16, 1907. Serial No. 384,005.

*To all whom it may concern:*

Be it known that I, GEORGE HARDIN, a citizen of the United States, residing at Uniopolis, in the county of Auglaize and State of Ohio, have invented new and useful Improvements in Nut-Locks, of which the following is a specification.

This invention relates to nut locks, the principal object of the same being to provide a nut in which the bolt opening therethrough is threaded partially through said opening, the remaining portion of said opening serving to frictionally lock said nut upon the unthreaded portion of the bolt.

Another object of the invention is to provide a nut lock in which the bolt may be of the ordinary construction and in which the nut is provided with means for frictionally engaging the body of the bolt.

These and other objects may be attained by means of the construction illustrated in the accompanying drawing, in which:—

Figure 1:
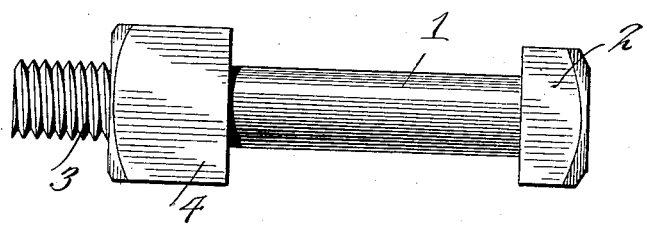
Figure 2:
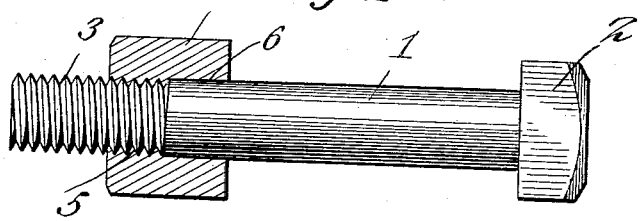

Figure 1 is a side elevation of a bolt and nut made in accordance with my invention. Fig. 2 is a side elevation of the bolt, the nut being shown in section.

Referring to the drawing for a more particular description of my invention, the numeral 1 designates a bolt which may be of the usual or any suitable construction provided with a head 2 and with a threaded end 3. The nut 4 is provided with a bolt opening extending through the same, said bolt opening being provided with interior screw threads 5 which extend substantially half way through the bolt opening and the remaining portion of said bolt opening being plain or unthreaded as at 6, to frictionally engage the body of the bolt 1.

By means of a nut made in accordance with my invention, the nut can be turned upon the bolt and when the smooth or plain interior wall 6 of the nut comes in contact with the plain portion of the bolt 1, the nut will be held frictionally against turning off the bolt, as will be obvious.

From the foregoing it will be apparent that the cost of producing such a nut is no greater, if as great, as the ordinary nut, and that the nut is firmly locked upon the bolt at any point after the unthreaded portion comes in contact with the smooth body of the bolt.

Having thus described the invention, what I claim is:

1. The combination with a bolt having a threaded portion and an unthreaded portion which lies between the threaded portion and head of the bolt, the diameter of which unthreaded portion is equal to the greatest diameter of the threaded portion; of a nut, the bore of which comprises an outer threaded portion to engage the corresponding portion of the bolt and an inner unthreaded portion of a diameter equal to the larger diameter of the nut threads and adapted to pass by the threads on the bolt and frictionally bind upon the unthreaded portion of the bolt.

2. The combination of a bolt having a threaded portion and an unthreaded portion located between the threaded portion and the bolt head; and a nut, the bore of which comprises an outer threaded portion and an inner unthreaded portion adapted to frictionally engage the unthreaded portion of the bolt.

In testimony whereof, I affix my signature in presence of two witnesses.

GEORGE HARDIN.

Witnesses:
 PEARL SARBER,
 GEO. TREMPERT.